July 5, 1960
E. H. CARRUTHERS
2,943,629
CUTTER BANK FOR HARVESTING MACHINES
Original Filed July 13, 1955
4 Sheets-Sheet 1
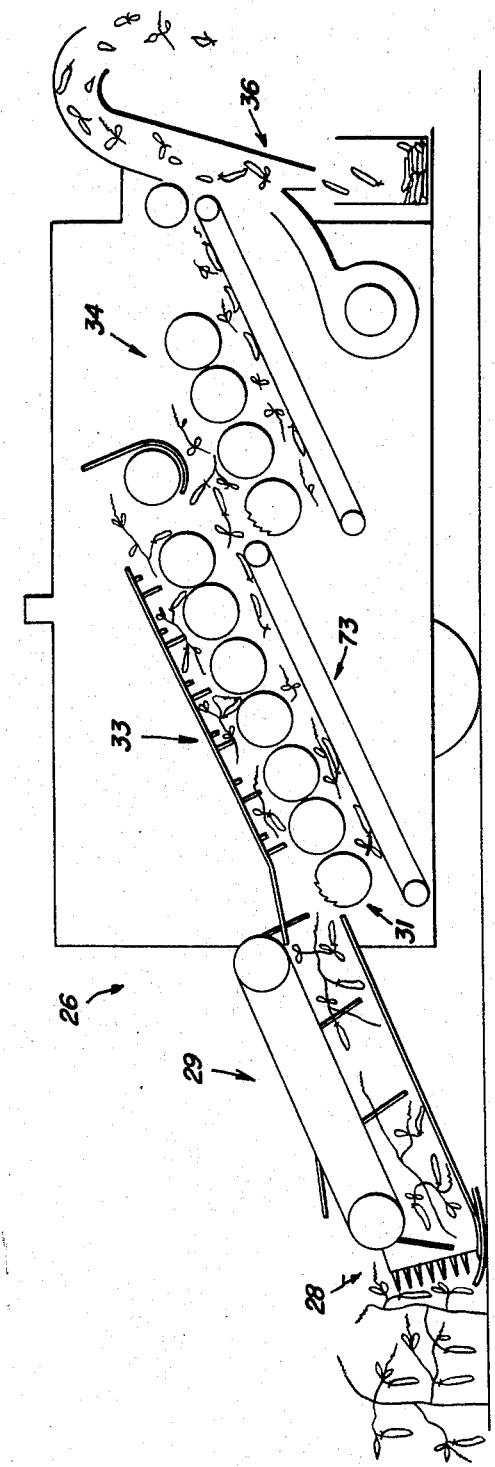
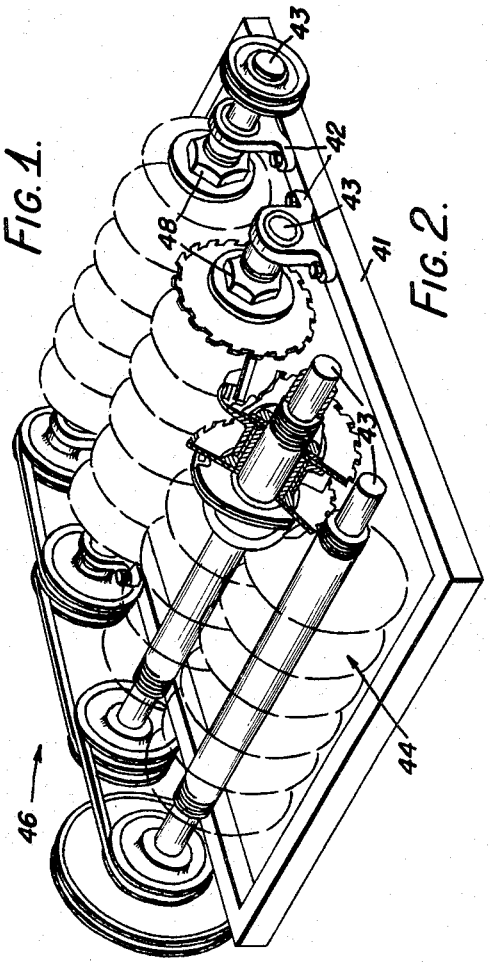
INVENTOR.
EBEN H. CARRUTHERS
BY
ATTORNEY July 5, 1960 E. H. CARRUTHERS 2,943,629
CUTTER BANK FOR HARVESTING MACHINES
Original Filed July 13, 1955 4 Sheets-Sheet 2
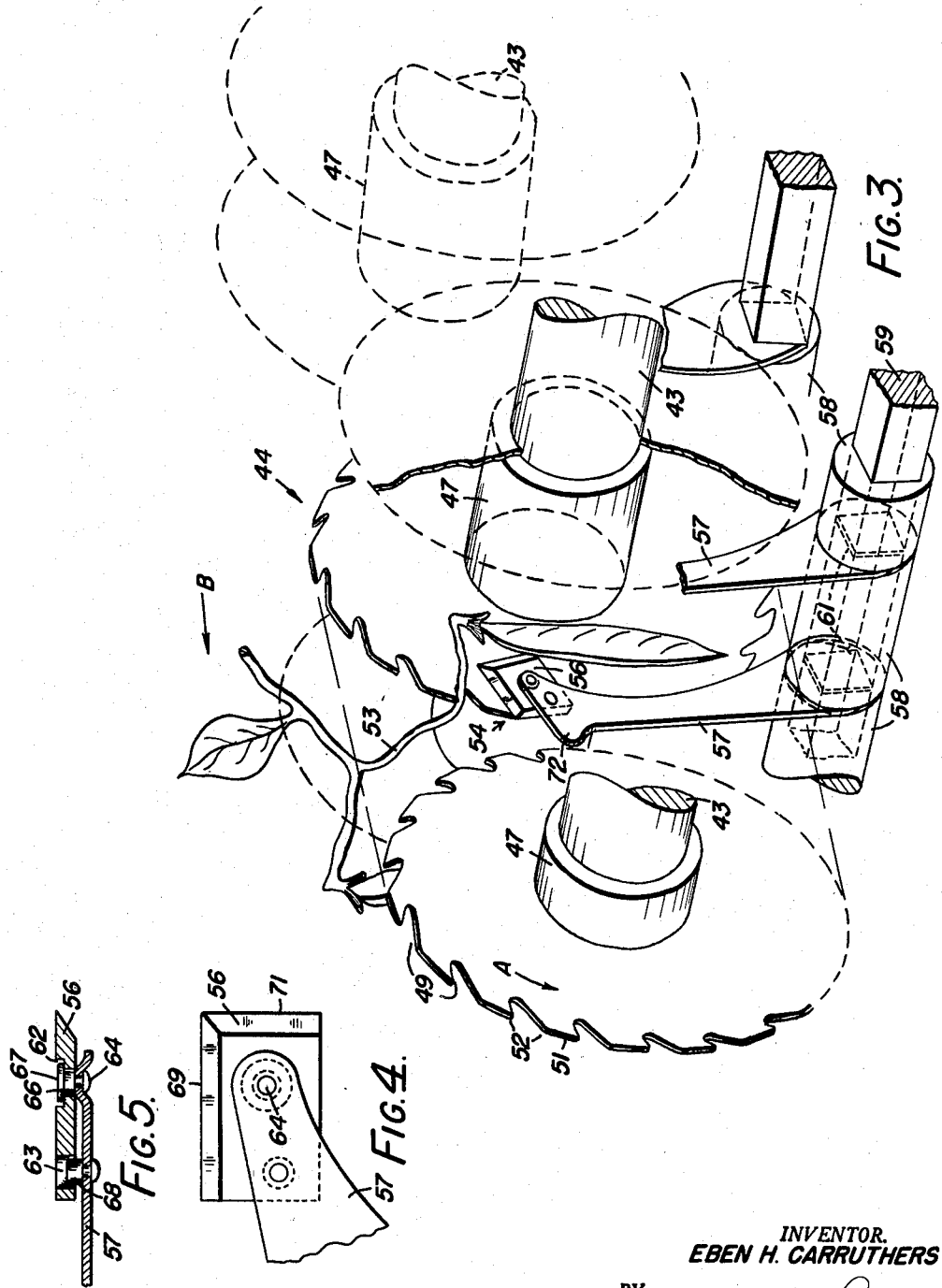
INVENTOR.
EBEN H. CARRUTHERS
BY
ATTORNEY July 5, 1960
E. H. CARRUTHERS
2,943,629
CUTTER BANK FOR HARVESTING MACHINES
Original Filed July 13, 1955
4 Sheets-Sheet 3
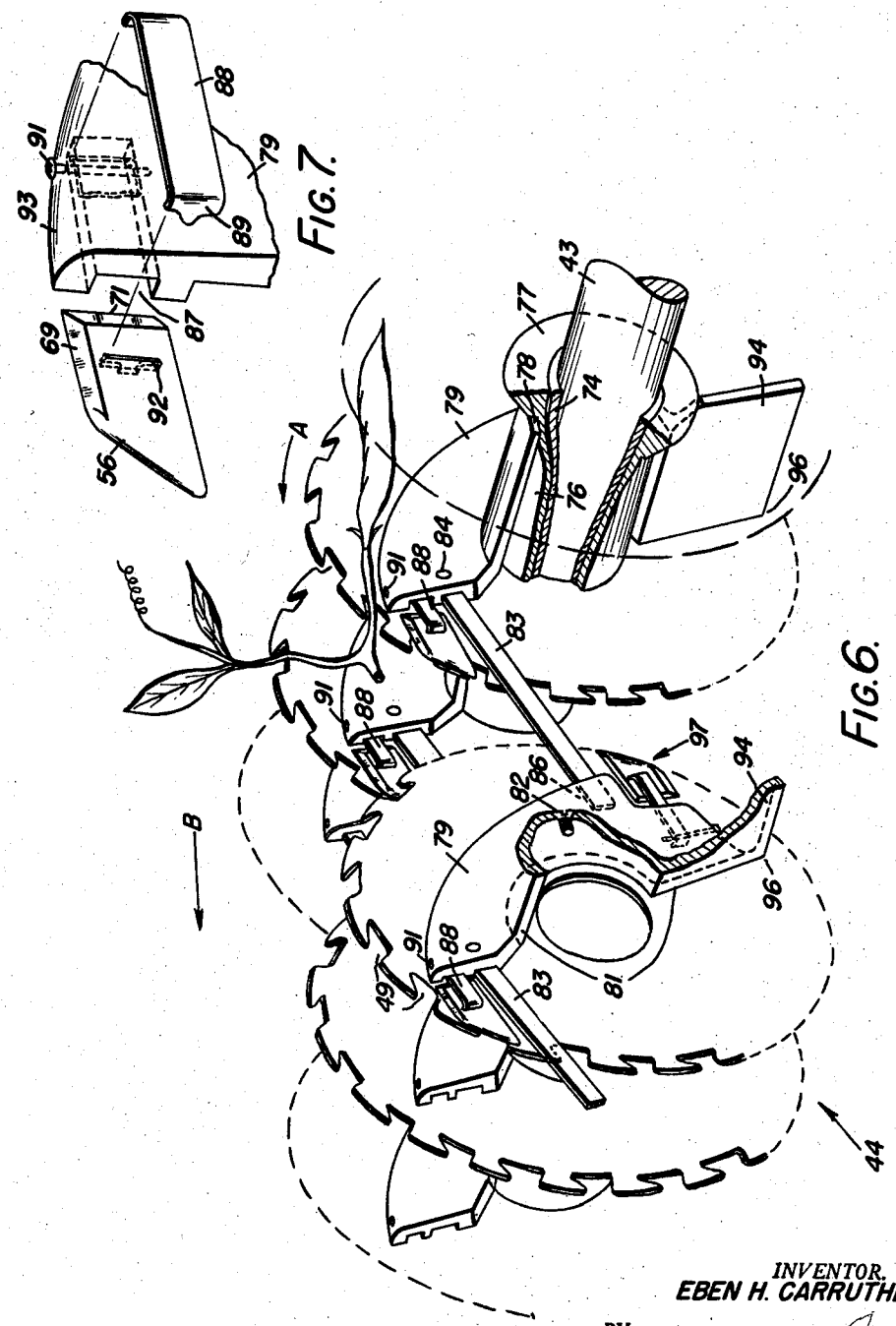
INVENTOR.
*EBEN H. CARRUTHERS*
BY
*ATTORNEY*

July 5, 1960
E. H. CARRUTHERS
2,943,629
CUTTER BANK FOR HARVESTING MACHINES
Original Filed July 13, 1955
4 Sheets-Sheet 4
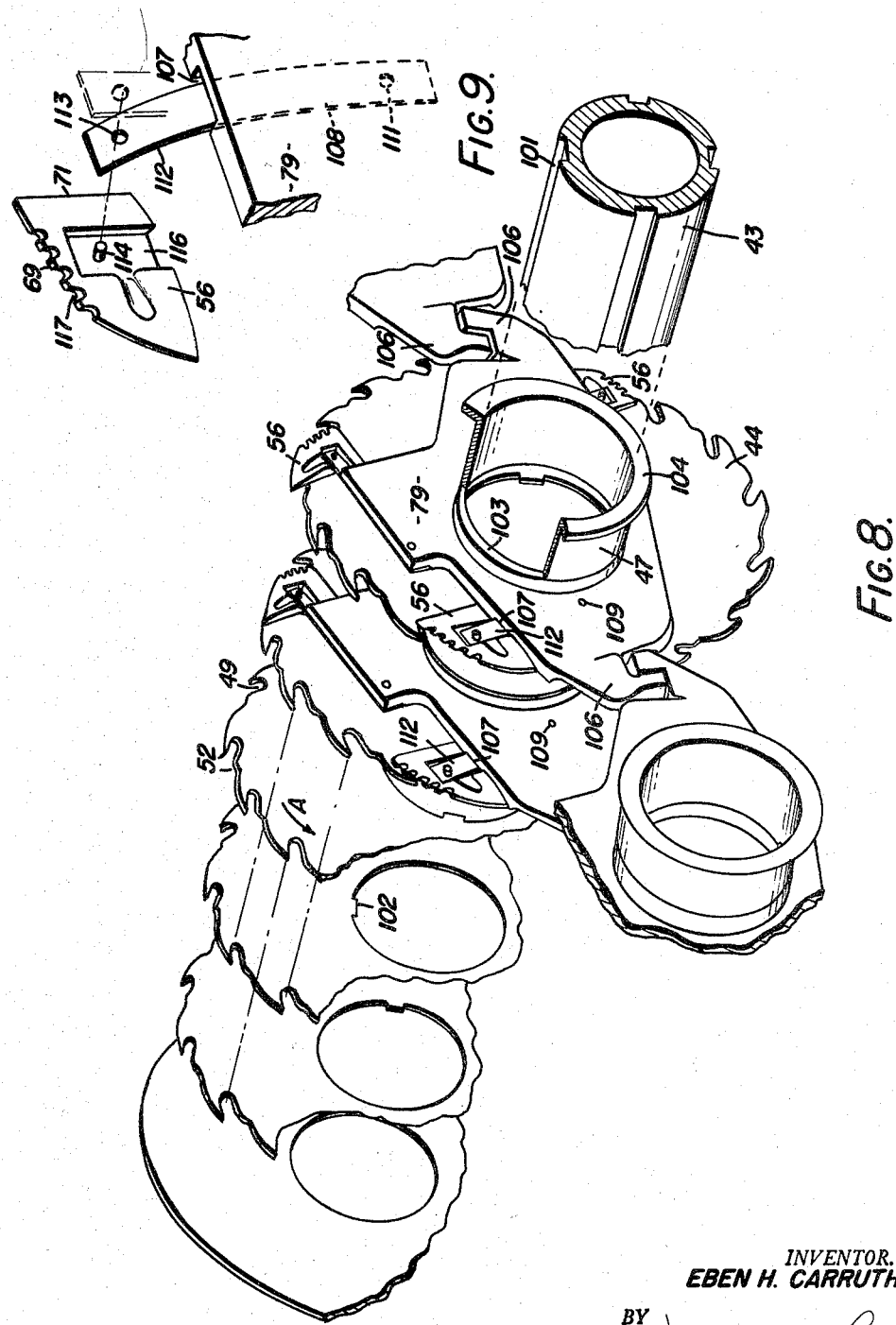
INVENTOR.
EBEN H. CARRUTHERS
BY
ATTORNEY

United States Patent Office 2,943,629
Patented July 5, 1960

2,943,629

CUTTER BANK FOR HARVESTING MACHINES

Eben H. Carruthers, Warrenton, Oreg., assignor to Chisholm Ryder Co., Inc., Niagara Falls, N.Y., a corporation of New York Original application July 13, 1955, Ser. No. 521,747. Divided and this application Sept. 17, 1956, Ser. No. 610,106

20 Claims. (Cl. 130—30)

My invention relates to a machine for harvesting vegetable products and more particularly to a machine for harvesting pod type vegetables. This application is a division of my co-pending application Serial No. 521,747, filed July 13, 1955, entitled "Machine for Harvesting Pod Type Vegetables, Cutting and Separating the Pods from the Stems and Leaves and Preparing the Vegetable for Canning or Freezing." Reference is also made to my co-pending application Serial No. 336,507, filed February 12, 1953, now abandoned, entitled "Machine for Cutting and Separating the Pods from Stems and Leaves of Pod Type Vegetables," and Serial No. 423,136, filed April 14, 1954, now Patent No. 2,763,114, entitled "Method for Harvesting Pod Type Vegetables, Cutting and Separating the Pods from the Stems and Leaves and Preparing the Vegetable for Canning or Freezing."

The present invention relates to a novel arrangement and construction of cutters to form a cutter bed for application to a machine of the type shown in the above mentioned co-pending application Serial No. 521,747. While the invention is particularly adapted for use in a machine for harvesting pod type vegetables and will be described in connection with the harvesting of peas, the invention may have application to the harvesting of other vegetable products.

An object of my invention is to provide a cutter bed or bank of cutters adapted to perform a multiplicity of cutting operations on a substantially continuous flow of vines, leaves and pods to the end that the vines and leaves are cut up and removed from the pods efficiently and expeditiously.

Another object of my invention is to provide a cutter bed having rotatable and stationary cutters so constructed and arranged that the leaves and vines will be separated or cut from the pods and the cut material when sufficiently finely divided will, without clogging of the cutter bed, drop through the cutter bed for latter separation of the pods from the leaves and vines.

More specifically my invention contemplates a machine wherein a multiplicity of rotatable cutter discs and stationary cutters are provided arranged longitudinally and transversely of the machine to form a cutter bed, the cutter discs and stationary cutters being spaced sufficiently closely that a mass of vines, leaves and pods removed from the field are supported on the cutter bed, the cutter discs being provided with slots adapted to grasp or snag the vines, the slots being sufficiently narrow that they will not accept a pod, the arrangement of parts being such that a multiplicity of cutting operations are performed successively on the mass until the pods are substantially free of leaves and vines.

Other objects and advantages of my invention will be particularly set forth in the claims and will be apparent from the following description, when taken in connection with the accompanying drawings, in which:

Fig. 1 is a diagrammatic view of the machine of my invention more particularly disclosed in the above mentioned co-pending application Serial No. 521,747;

Fig. 2 is a perspective view of a cutter bank for removing the vines and leaves from the pods of pod type vegetables;

Fig. 3 is an enlarged perspective view partly in section of a portion of the vine cutting bed or bank of cutters with parts being broken away better to illustrate this part of the invention;

Fig. 4 is an enlarged view of one of the stationary cutter knives or blades;

Fig. 5 is a top plan view partly in section of Fig. 4 showing how the cutter blade of Fig. 4 is flexibly mounted;

Fig. 6 is a view partly in section similar to Fig. 3 showing an alternate and perhaps preferred form of stationary and rotatable cutters and particularly showing a mounting of the stationary cutters designed to reduce the tangling or massing of the vines;

Fig. 7 is a perspective exploded view illustrating how the stationary cutter blades of Fig. 6 are flexibly mounted;

Fig. 8 is a perspective view of a portion of a cutter bed illustrating another form of my invention; and Fig. 9 is a perspective exploded view of the stationary cutter and mounting therefore of the modification shown in Fig. 8.

Referring to Fig. 1, the cutter bed, a portion of which is shown in Fig. 2, is adapted for use in connection with a machine having a main frame generally indicated by the numeral 26; sickle bar assembly generally indicated by the numeral 28 located at the forward end of the machine; a conveyor unit generally indicated by the numeral 29; a primary cutter bed or bank of cutter blades 31; a rake finger assembly or conveyor generally indicated by the numeral 33; a secondary cutter bed or bank of cutter knives generally indicated by the numeral 34; and a separation unit generally indicated by the numeral 36.

The machine generally described above is specifically described in my co-pending applications Serial Nos. 423,136 and 521,747 and need not be more specifically described herein. Moreover, Fig. 1 shows a particular harvesting machine, but it will be appreciated that the cutter bed of the present invention may be employed in harvesting machines in which the parts are differently constructed and arranged than as shown in the above applications.

Mounted on side structural members 40 of a cutter bank frame 41, Fig. 2, carried by the main frame is a plurality of bearing brackets 42. The bearing brackets 42 provide bearing supports for a plurality of shafts 43. A plurality of cutter or severing discs, generally indicated by the numeral 44, is mounted on each of the shafts 43, the cutter discs being spaced transversely along the shafts to form the cutter bed or bank of cutter discs. The drive for the cutter disc shafts has been indicated generally at 46, but is more fully set forth in the above mentioned co-pending application Serial No. 521,747.

As shown most clearly in Fig. 3, the snipper or cutter discs 44 mounted on the shafts 43 are separated from each other along the shafts by means of spacer sleeves 47 and are rigidly secured with relation to the shafts 43 by being clamped between jamb nuts 48 at the ends of the shafts 43 as shown in Fig. 2. Thus the cutter discs and spacer sleeves rotate with the shafts as a unit. It will be understood that the spacing of the shearing or cutter discs may be varied from that shown by employing shorter or longer spacing sleeves. The number of shearing discs also may be varied from the number shown, depending upon the width of the machine and the character of the material being cut. Moreover, in the drawings, I have indicated seven transverse shafts 43, Fig. 1, constituting the shafts of the main cutter bed 31. This also may be varied to suit the conditions encountered. The primary cutter bed 31 is thus made up of a large number of cutter discs. The cutter discs may be placed in alignment longitudinally of the cutter bed or may be placed in staggered relation on adjacent shafts. The cutter bed as a whole, as shown in Fig. 1, preferably rises from the left of that view to the right, that is from the material entrance end to the material discharge end.

Each of the cutter or snipper discs 44 has a plurality of openings or slots 49 extending inwardly from its periphery 51. The margins 52 defining these slots 49 are spaced apart a distance greater than the diameter of the vines, one of which has been indicated by the numeral 53 in Fig. 3. However, the pods are of substantially greater diameter than the vines and the margins 52 of the slots 49 are spaced apart a distance less than the diameter of the pods so that the pods cannot enter the slots and will in effect be rejected by the slots.

Continued rotation of the cutting discs causes the pods to ride out of any bridging relation they may have attained with respect to the slots 49. The slots may extend inward toward the center of the discs at any angle with respect to a radius. I have found, however, that the vines more freely enter the slots 49 if they extend inward at an angle to a radius such that the inner ends of the slots trail the outer ends thereof. It will be apparent from an examination of Fig. 3 and considering the direction of rotation of the discs as indicated by the arrows A, rotation of the cutting discs will automatically and positively force the vines 53 toward the bottoms of the slots. At the same time the rotation of the cutter discs moves the mass of vines in the direction in which the discs are rotating. In Fig. 3, I have indicated the direction of movement of the vines by the arrow B, that is, as viewed in Fig. 1 (Fig. 3 being taken from the opposite side of the machine), the vines move up the bank of cutter discs or the cutter bed from left to right.

As the cutter discs rotate, they pass in shearing or severing relation to stationary cutter knives, generally indicated by the numeral 54, each having a cutter or shearing element 56. I have found that it is very essential the rotatable snipper or shearing discs 44 shall pass in close shearing relation to the stationary shearing knives or cutters 56. It is important that the cutting of the vine parts be clean so that there is no tearing or shredding. Torn or shredded fibres have a tendency to remain in the teeth and impair the cutting action.

In order to maintain proper shearing action and avoid tearing or shredding of the vines, I have found it desirable to hold the stationary shearing knife against the rotatable snipper or cutter discs under a yielding pressure. I have also found that the stationary shearing knife should preferably be mounted on a flexible support which will yieldingly urge the stationary shearing knife 56 against the rotating face of the cutter disc, particularly to allow the stationary shearing knife to follow any out of trueness of the cutter discs and thereby maintain the shearing, clean cutting relationship of the parts.

For the above purposes, the shearing knives 56 are supported by flexible arms 57. These arms are biased or tensioned in a direction so as to cause the shearing knife 56 to exert a pressure against the face of the cutter disc. The flexible arms are held stationary at their lower ends by means of spacer sleeves 58 which extend over a rectangular rod or fixed bar 59. The flexible arms at their lower ends are therefore provided with rectangular openings 61 to fit over the rectangular bars. When the arms are mounted on the bar and spaced properly by the sleeves, the arms are rigidly held in position but are free to flex slightly to conform to any out of trueness of the cutter discs.

In Figs. 4 and 5, I have illustrated how the shearing knives 56 are carried on the upper ends of the flexible arms 57. Such means may comprise openings 62 and 63 formed in the body of the shearing knives 56. Riveted as indicated at 64 to the upper end of the flexible arm 57 is a retaining member 66 which has a loose fit in the opening 62 but is retained therein by a flange 67. A second retaining device 68 is riveted to the upper end of the flexible arm 57 and has a loose fit in the opening 63. By this means although the shearing knife 56 is yieldingly held against the face of the rotating snipper disc 44, not only may the flexible arms 57 yield but also the shearing knife 56 may shift its position about the retaining element 66 to a limited extent to maintain shearing relation with the snipper disc with the cutting edge 69 thereof at substantially a right angle to the direction of movement of vines caught in the slots 49. The edge 71 of the stationary shearing knife is also provided with a sharpened cutting edge to scrape off any material which may collect on the face of the cutter disc adjacent the knife.

As will be observed from an examination of Fig. 3, the flexible arms 57 lie between two adjacent parallel shafts 43. While the arms thus do to some extent restrict the space which exists around and between the cutter discs, spaces do exist over the entire area of the bed through which cut vines, leaves and pods may fall. As to material which is uncut, the arms serve as a bridge to buoy up the mass of material and permit the cutter discs during their rotation to urge the uncut vines, leaves and pods in the direction of the arrow B of Fig. 3 up the cutter bed. Each of the flexible arms 57 is provided with a heel 72 which aids in forming this bridge and to partially prevent a large mass of uncut material from lodging between adjacent arms and between adjacent shafts, and to guide uncut vines to the succeeding cutter discs.

The shearing elements or cutter discs mounted on the shaft 43 at the right of Fig. 3 may be offset with relation to the shearing elements or cutter discs mounted on the shaft at the center of Fig. 3. Similarly the cutter discs throughout the bank of cutter discs may be offset with respect to each other. This is perhaps the more desirable arrangement when only one cutter bed is employed. However, when two or more cutter beds are employed it is desirable to place the cutter discs in alignment up the cutter bed to allow larger unimpeded spaces through which cut vines and leaves may fall. Thus the material conveyed to the primary cutter bank is fed over the sets of cutter discs comprising the bank and the cutter discs and the vines left uncut by the first set of cutting elements at the right of Fig. 3 tend to be caught or snagged and cut upon entering the slots in the rotatable cutter discs of succeeding sets until the material is sufficiently finely divided to drop through the spaces in the bank of cutter elements to a conveyor 73 lying beneath the primary cutter bed 31.

The above described arrangement of cutter discs 44, shearing knives 56 and flexible arms 57 for the most part operates satisfactorily. However, at times during the operation, there is a tendency for the partly cut vines and pods to clog between the flexible arms and fixed bars upon which they are mounted. Occasionally also uncut vines may start winding on the rotating spacer sleeves or hubs 47. For this reason I have developed what may be considered a preferred form of cutter discs and cutter knives of which the cutter bed of Fig. 2 is made up, shown in Figs. 6 and 7.

In the form of the invention shown in Figs. 6 and 7, the shafts have been again indicated by the numeral 43, the cutter discs by the numeral 44, the direction of rotation of the cutter discs by the arrow A, and the direction of movement of the vines, leaves and pods up the cutter bed by the arrow B. The shape of the slots 49 adjacent the periphery of the cutter discs for the reception of the vines is approximately the same as shown in Fig. 3. The same principles are retained, namely that the slots accept the vines and reject the pods and the inner portions of the slots accomplish the hooking or snagging action with respect to the vines above described.

As in the case of the construction shown in Figs. 3 to 5 inclusive, the cutter discs 44 are clamped on the rotating shafts 43 between collars or spacing sleeves 47. Between each pair of cutter discs 44 on the same shaft 43 and stationary with respect to the rotating collars or spacing sleeves 74 are bushings or mounting hubs 76. One end of each of the mounting hubs 76 is enlarged to provide an abutment 77 or thrust bearing against the adjacent cutter disc. Each mounting hub is further provided with an annular shoulder 78 against which the annular end of a cutter holder casting 79 butts. One entire side of a cutter holder casting 79 including the bore thereof is open-sided, as indicated at 81, so that it may be slid sidewise over the mounting hub 74 and be secured thereto by means of a screw 82.

By the means thus described, each cutter holder casting with the cutter knives thereon, as will presently appear, may be removed from the machine without removal of the cutter discs, spacing sleeves 74 or mounting hubs 76, to effect repairs, untangling of vines or sharpening of cutting or shearing knives.

The cutter holder castings 79 and the mounting hubs 76 by reason of the screws 82, are prevented from rotating with the cutter discs and spacing sleeves 74 by bars 83. Each bar 83 is fastened in a slot formed in the cutter holder casting 79 by means of a rivet 84. The bar bridges the gap between two adjacent cutter disc shafts 63 and is loosely lodged in a slot 86 formed in the next adjacent cutter holding casting. Thus the bar 83 may be freely removed with the cutter holder casting to which it is secured upon removal of the screw 82.

At the upper part of the cutter holder casting 79 a rectangular slot 87 is cut in the side edge of the casting for the reception of a spring 88 which is essentially flat but has curved ends, one curved end being formed as shown at 89. The spring 88 is mounted in the margins of the slot 87 and held in position by means of a pin 91 which extends through bores formed in the cutter holder casting, the spring being lodged behind the pin.

The formed end 89 of the spring extends loosely into a correspondingly formed recess 92 formed in the cutting or shearing knife 56 which may be similar to the cutting knife 56 of Fig. 4. The cutting knife similarly has a cutting or shearing edge 69 and a scraper edge 71. It will thus be observed that the cutting knife 56 of Fig. 7 is flexibly mounted so that it may shift its position slightly and still is firmly and flexibly pressed against the face of the cutter disc by the spring 88. It will further be observed that the spring 88 is recessed in the cutter disc holder so that the smooth and rounded periphery 93 of the cutter disc holder is presented to the material being cut. Most of the mounting spring for the cutter knife 56 in which material is likely to be caught is enclosed.

I have found it desirable to provide a baffle plate 94 to prevent winding of the vines around the adjacent rotating parts. The baffle plate 94 may be cast integral with the cutter holder casting 71 and preferably extends nearly the full width between adjacent cutter discs and outwardly to a point adjacent the inner part of the circle of rotation of the cutter slots as shown at 96. The outer edge of the baffle 94 is spaced inward from the periphery of the cutter disc as indicated at 96 because any vine part snagged in one of the slots at its point of passing the baffle would be shredded or torn. As previously stated, it is very desirable that all cuts be made without shredding or tearing to prevent clogging of vine parts.

Since the baffle plate 94 does not extend to the periphery of the cutter discs, it is possible that some vine parts snagged in the slots may be carried past the baffle and upward to the under side of the bar 83. It is of course essential that a substantial clearance exist between the bar 83 and the adjacent rotating cutter discs. Vine parts thus carried upward past the baffle to the under side of the bar 83 might become jammed between the bar and the cutter disc. To prevent this possibility a second cutting or shearing knife assembly, generally indicated by the numeral 97, and similar to the cutting knife assembly shown in Fig. 7, is provided below the bar 83 so that any vine parts carried past the baffle and upward toward the bar 83 may be sheared clean and fall freely to the conveyor located below the primary cutter bed 31.

In Figs. 8 and 9 I have shown another form of cutter bank or bed which I have found practicable in an experimental pea harvester. The shafts 43 are mounted in the bearing brackets 42. The shafts are provided with keyways or splines as shown at 101. Each of the cutter discs has a key 102 to enable the cutter discs to be fitted on the splines 101 of the shafts 43. The cutter holder castings or supports 79 have a flange 103 against which one end of the sleeve 47 bears. The sleeve 47 has a flange 104 which bears against the face of the next adjacent cutter disc 44. The supports 79 for the stationary knives and the sleeves 47 are loose with respect to the shaft 43 and the entire assemblies mounted on the shafts may be held in position by jamb nuts on the ends of the shafts and shown in Fig. 2.

In this modification the cutter holders or supports 79 are provided with lateral extensions which terminate in hook shaped parts 106. The hook shaped part 106 of the supports 79 interengage with corresponding hook shaped parts of supports on adjacent shafts. Since each support has two hook shaped parts 106 which interengage with hook shaped parts on the next adjacent shafts, it will be seen that the supports are in alignment with each other throughout the bank and the supports in the same row are in effect a unit.

As indicated by the arrow B, the direction of rotation of the shafts 43 and cutter discs is counterclockwise as viewed in Fig. 8. Thus any tendency of the stationary cutter supports 79 to rotate with the cutter discs results in more tight interlocking of the stationary cutter supports. When it is desired to remove any cutter discs or stationary cutter holders or renew any particular shaft, when the shafts are stationary, the cutter holders of the shaft to be removed or upon which elements to be replaced are mounted, are rotated in a clockwise direction, as viewed in Fig. 8, to disengage the hook shaped locking element 106 after which upon removal of the jamb nuts at the ends of this particular shaft, all elements on that shaft may be slid off the end thereof.

In the arrangement shown in this modification each stationary cutter holder or support 79 has three stationary cutters 56 mounted thereon. The stationary cutters may be spaced as desired but preferably two of these stationary cutters 56 are mounted so that they will be adjacent the top of the cutter disc. The cutter holders 79 have slots 107 for the reception of leaf springs 108. The leaf springs are held in the holders by the margins of the slots 107 and by a pin 109 which extends through an opening 111 formed in the leaf spring.

The upper end 112 of the leaf spring has an aperture 113 for loose reception on a pin 114 carried in a slot 116 formed in the stationary knife 56. The upper end 112 of the leaf spring has some play in the slot 116 so that the stationary cutter knife 56 may shift slightly both around the axis of the aperture 113 and laterally to allow for any unevenness or out of trueness of the cutter discs. The shearing edge 69 is provided with serrations 117 and as the cutter discs rotate and carry the vines into shearing relation with the stationary cutters 56, the vines tend to lodge in the serrations 117 and are sheared. The shearing appears to be with considerably less shredding than when straight shearing edges are provided as in the previously described arrangements.

The advantage of the arrangements shown in Figs. 6 and 7 and 8 and 9 over that shown in Figs. 3, 4, and 5 lies in the fact that the stationary cutters are carried by supports which encircle the shafts upon which the cutter discs are mounted. Thus the bars 59, sleeves 58 and spring arms 57 of Fig. 3 are eliminated. These elements in the structure shown in Fig. 3, appear occasionally to cause clogging of materials. In the modifications shown in Figs. 6 and 7 and 8 and 9, the cutter bed is more open so that material which has been cut may drop through the cutter bed and clogging is minimized.

While I have shown and described the preferred forms of mechanisms of my invention, it will be apparent that various changes and modifications may be made therein, particularly in the form and relation of parts, without departing from the spirit of my invention as set forth in the appended claims.

I claim:

1. A machine for removing the vines and leaves from the pods of pod type vegetables comprising, in combination, a rotatable cutter disc having peripheral slots therein into which vines are caught as the cutter rotates, means for rotating said cutter disc, at least one stationary cutter in shearing relation to which said cutter disc rotates, a support for said stationary cutter and yielding means between said support and said stationary cutter for maintaining said stationary cutter in yielding shearing relation to said cutter disc.

2. A machine in accordance with claim 1 in which the cutter disc and the stationary cutter have engaging flat faces and the connection to the stationary cutter is a loose one to permit the stationary cutter to accommodate itself to any out of trueness of the cutter disc.

3. A machine in accordance with claim 1 in which the stationary cutter has a shearing edge and the connection to it is a loose one to permit the stationary cutter to accommodate itself to any out of truenesses of the cutter disc and adjust itself angularly for positioning the shearing edge in shearing relation to the oncoming vines caught in said slots.

4. A machine for removing the vines and leaves from the pods of pod type vegetables comprising, in combination, a plurality of spaced parallel shafts extending transversely of the machine, a plurality of spaced cutter discs mounted on each of said shafts each of said discs having a plurality of slots in its periphery and each of said slots being wider than the diameter of a vine and narrower than the diameter of a normal pod, a plurality of stationary cutters at least one of which is in shearing relation to each cutter disc, supports for said stationary cutters loosely mounted on said shafts and means interconnecting the supports on adjacent shafts and releasably locking them together.

5. A machine for removing the vines and leaves from the pods of pod type vegetables comprising, in combination, a plurality of spaced parallel shafts extending transversely of the machine, a plurality of spaced cutter discs mounted on each of said shafts each of said discs having a plurality of slots in its periphery and each of said slots being wider than the diameter of a vine and narrower than the diameter of a normal pod, a plurality of stationary cutters at least one of which is in shearing relation to each cutter disc, supports for said stationary cutters loosely mounted on said shafts a pair of locking devices on each of said supports, the locking devices of a support on one shaft interengaging with the locking devices on the supports of the two adjacent shafts in a manner such that the direction of rotation of the shafts tends to interconnect the supports of adjacent shafts and prevent their rotation but rotation of the supports when the shafts are stationary in the opposite direction from the direction of rotation of the shafts releases the locking devices to enable disassembly of the supports and cutter discs from the shafts.

6. A cutting bank for a machine for removing vines and leaves from the pods of pod type vegetables comprising, in combination, a plurality of spaced parallel shafts extending transversely of the path of travel of the vegetable materials from a cutting bank entrance to a cutting bank discharge, a plurality of spaced cutter discs mounted on each of said shafts, a plurality of stationary cutters at least one of which is in shearing relation to each of said cutter discs, each of said cutter discs having a plurality of slots extending inward from its periphery with each slot having an entrance of sufficient width to accept a vine but insufficient to accept a pod, the rotation of said cutter discs as the vines are caught being at least partially the force urging the mass of vegetable material through the cutting bank from the entrance to the discharge, means for rotating said cutter discs and means for yieldingly urging said stationary cutters into shearing relation with the cutter discs, said cutter discs being spaced longitudinally and transversely of the cutting bank sufficiently close that the mass of material is supported but sufficiently far apart to provide a multiplicity of substantially clear open spaces so that as the material is cut, the cut material to a large extent including pods may drop through the bank.

7. A cutting bank in accordance with claim 6 wherein supports for the stationary cutters are loosely mounted on said shafts and means are provided for releasably locking said supports against rotation with the shafts.

8. A cutting bank in accordance with claim 6 wherein supports for the stationary cutters are loosely mounted on said shafts, each of said supports having a pair of locking parts with each of said locking parts locking with the locking part of a support mounted on an adjacent shaft.

9. A cutting bank in accordance with claim 6 wherein supports for the stationary cutters are loosely mounted on said shafts, means are provided for releasably locking said supports against rotation with the shafts and a loose connection is provided between the stationary cutters and their supports.

10. A cutting bank in accordance with claim 6 wherein the stationary cutters each have a flat face and a shearing edge with the yielding means urging said flat face against the face of the associated cutter disc and with said shearing edge in cooperative shearing relation with the periphery of the cutter disc.

11. A cutting bank in accordance with claim 6 wherein the stationary cutters each have a shearing edge and a scraping edge with the shearing edge held in shearing relation with the periphery of the cutter discs and the scraping edge in scraping relation to the side face of the cutter disc.

12. A cutting bank in accordance with claim 6 wherein each of the stationary cutters has a serrated edge and a flat face held against the face of its associated disc with the serrated edge in registry with the slotted periphery of its associated disc.

13. A machine for removing vines and leaves from pod type vegetables comprising, in combination, a plurality of sets of relatively movable severing elements, movable in vine severing relation to each other, said sets of severing elements being arranged transversely of the machine to form a severing section, a multiplicity of said severing sections arranged longitudinally of the machine to form a severing bank of extensive length, one of said sets of severing elements being a multiplicity of rotatable discs, means for rotating said discs at a high rate of speed, said discs each having a plurality of slots extending inward from its periphery, said slots each having an opening adjacent the periphery for the reception of vines but being smaller than the diameter of normal pods whereby the vines are accepted by the slots and pods are rejected, said severing bank having an entrance end and a discharge end, said rotatable discs being rotatable in a direction such that when the vines enter the slots, the continued rotation of the discs tends to move the vegetable material from the entrance end toward the discharge end of the severing bank, the action of the severing elements being such that a multiplicity of successive and rapidly repeated severing actions are exerted on the vines so that they are in a relatively finely divided state and the pods are for the most part intact with the edible seeds sealed therein and protected against dust and dirt and substantial loss of moisture.

14. A machine in accordance with claim 13 in which the severing bank has the severing elements thereof arranged sufficiently close that the mass of material is supported adjacent the entrance end but spaced sufficiently far apart to provide a multiplicity of clear open spaces in the severing bank so that as the vines are cut as they move toward the discharge end, the cut material including pods that may be attached to relatively small pieces of vine may drop to a position below the severing bank.

15. A machine in accordance with claim 13 in which each of said slots extends at an angle to a radius such that the inner portion of the slot trails the outer portion as the disc is rotated.

16. A machine for removing the vines and leaves from pod type vegetables comprising, in combination, a disc and at least one stationary severing member in severing relation to which said disc rotates to form a vine severing device, said disc having a plurality of slots extending inward from its periphery, said slots each having an opening adjacent the periphery for the reception of vines but being smaller than the diameter of the pods, said slots extending inward at an angle such that the inner ends of the slots trail the outer ends as the disc is rotated to the end that the rotation of the disc tends to force a vine caught in a slot toward the bottom of the slot, means for rotating said disc, a plurality of discs and severing members extending transversely and longitudinally of the machine to form a bank of severing devices, a second bank of similar severing devices located at a level below said first bank, the severing devices of said lower bank being more closely spaced than those of the upper bank and the area occupied by the upper bank being largely open to enable small vines and partially severed vines to drop to the level of the lower bank for further severing.

17. A machine for removing the vines and leaves from pod type vegetables comprising, in combination, a plurality of movable severing elements, a plurality of stationary severing elements, each movable severing element being mounted in severing relation to at least one stationary severing element to constitute a set of severing elements, said sets being mounted transversely and longitudinally of a severing area to form a severing bank, means for supporting said stationary severing elements and means for actuating said movable severing elements, said sets of severing elements and the supports therefor being spaced both longitudinally and transversely a distance apart such that most of the severing area is free and open whereby cut material including vines, pods and leaves may freely drop through the spaces in the severing area, said movable severing elements being rotatable discs each having slots extending inward from its periphery, each of said slots extending at an angle to a radius such that the inner portion of the slot trails the outer portion thereof as the disc is rotated and each of said slots being of a width at least at the periphery narrower than the diameter of a normal pod but wider than the diameter of a vine.

18. A machine in accordance with claim 17 in which most of the discs rotate in the same direction and urge the material being severed over the severing bank from a point of entry in a direction longitudinally of the severing bank.

19. A severing bank for separating vines and leaves from the pods of pod on vine type vegetables comprising, in combination, a plurality of sets of severing elements arranged transversely of the machine, said sets of severing elements being relatively movable to sever the vines and leaves from the pods and one each of said severing elements being a rotatable disc, said discs each having slots therein extending inward from the periphery thereof with each of said slots having an entrance of sufficient peripheral width to accept a vine but insufficient to accept a pod, said sets of severing elements being repeated successively longitudinally of the machine to define a severing bed with sufficiently close spacing of the severing elements both transversely and longitudinally that a mass of uncut material is supported by the severing bed but with sufficient spacing that severed material drops through the spaces to a position below the severing bed, means for rotating most of said cutter discs in the same direction at a rate of speed such that the mass of material is rapidly passed from one transverse set of severing elements to the next succeeding longitudinal set and the mass is subjected to a number of successive and rapidly repeated severing actions, the action of the severing bed being such as to sever the vines and leaves from the pods and retain the pods substantially intact with the seeds protected within the pods from dust and dirt and substantial loss of moisture.

20. A severing bank in accordance with claim 19 in which the slots each have a leading portion at said periphery and a trailing portion inward from said periphery with the trailing portion being displaced rearward of the leading portion radially with respect to the axis of rotation.

References Cited in the file of this patent
UNITED STATES PATENTS

| Number | Name | Date |
| --- | --- | --- |
| 1,352,197 | Johnson et al. | Sept. 7, 1920 |
| 2,187,026 | Hamachek | Jan. 16, 1940 |
| 2,311,169 | Gordon et al. | Feb. 16, 1943 |
| 2,487,911 | Wehn | Nov. 15, 1949 |
| 2,587,289 | Cook | Feb. 26, 1952 |
| 2,608,973 | Coons | Sept. 2, 1952 |
| 2,661,745 | Nelson | Dec. 8, 1953 |